June 30, 1953 H. R. RENSCH 2,644,039

CIRCUIT ARRANGEMENT FOR CONFERENCE CALL INSTALLATIONS

Filed Aug. 11, 1950 3 Sheets-Sheet 1

INVENTOR
HEINZ R. RENSCH

BY Robert Harding Jr.
ATTORNEY

INVENTOR
HEINZ R. RENSCH
BY Robert Harding Jr.
ATTORNEY

INVENTOR
HEINZ R. RENSCH

BY Robert Harding Jr.
ATTORNEY

Patented June 30, 1953 2,644,039

UNITED STATES PATENT OFFICE 2,644,039

CIRCUIT ARRANGEMENT FOR CONFERENCE CALL INSTALLATIONS

Heinz Robert Rensch, Korntal (Wurttemberg), Germany, assignor to International Standard Electric Corporation, New York, N. Y., a corporation of Delaware Application August 11, 1950, Serial No. 178,817
In Germany August 5, 1949

15 Claims. (Cl. 179—1)

This invention relates to a conference call system adapted to be controlled by a main station, or an auxiliary station, and in which said stations can share their control of the system with any of a plurality of extension stations.

The subject of the invention is a circuit arrangement for loudspeaker installations with two-way speaking operation with one main station and several extension stations and conference call operation between any number of the telephone stations, in which all telephone stations are equipped with a loudspeaker, which can be interchangeably used as a microphone, and in which the telephone communication takes place by way of a common reversible direction amplifier. To avoid the disadvantages of known arrangements to a great extent, the circuit arrangement according to the invention is such devised in a way that normally the main station is connected to the amplifier input, while the extension stations are connected in parallel to the amplifier output, and that the switching devices, which are to establish connections, are exclusively attached to the main station, while the extension stations merely contain switching devices which are to call the main station and to reverse the speaking direction through the amplifier toward the main station.

The particular advantage of this arrangement consists in the fact that the main station, besides the selection of the subscribers, must be arranged not to take any further switching measures during the conference and is enabled to speak without interruption. The subscribers at the extension stations answer singly by actuating their speaking keys, for which, contrary to the usual subscriber selecting switches, it is best to utilize non-locking keys; so that only the answering station is changed over from the amplifier output to the input, while all other stations remain connected to the output and are receiving. Thus the background room noise of only one single station is fed through the amplifier system, a fact which is of great importance considering the high amplification which is required when a central amplifier is used. In this the main station need not take any switching measure. It is unable, however, to interrupt the answering station as shall be explained later in a more detailed way. Since the reversal of the direction is left to the individual extension stations, the arrangement according to the invention is especially fit for dictating. By this arrangement it is also rendered impossible that extension stations are inadvertently overheard.

The already mentioned high level amplification for the common central amplifier involves a considerable feedback danger, which is not taken into account sufficiently in the known arrangements. In the arrangement as specified by the invention several advantageous measures are employed, by which this problem is met. Thus shielded, twin-wire cables are used for the connecting lines to the single subscribers. By this the further advantage is achieved that one can use only one signaling relay for each extension station by arranging the signaling circuit, which consists of the outside shielding and the two speaking wires, in a way that the signaling current flows through the speaking wires symmetrically. With this, the cable cost becomes very small; besides, filtering elements can be saved in that part of the arrangement which supplies the relay, since buzzing voltages enter into the speaking circuit only with a fraction of their value corresponding to the asymmetry factor.

The connecting capacities of the contacts of the switch relays, by means of which the changing-over of the telephone stations from the one to the other side of the amplifier is performed, account for a large part of the possible feedback paths. These connecting capacities of the relay springs couple the input and output of the amplifier the more tightly, the higher the number of the telephone stations in the installation. It has been stated that this connecting capacity amounts to 5 $\mu\mu$f. for each spring when light duty relays of the usual design are used. Because of the high grade of amplification required and because of the greater band width, which must be employed to ensure a perfect loudspeaker operation, this capacity makes the amplifier subject to audio feedback even with a relatively small number of telephone stations. It is possible, certainly, to adjust these connecting capacities, whose sum is fixed, by means of additional trimming condensers. This method, however, is not practical in that the capacity values which must be adjusted in this case are rather high as such, so that inaccuracies in the adjustment as, for instance, capacity variations occasioned by influences of the temperature, can easily reach the critical value for the commencement of the feedback. Therefore, according to the invention, this capacity is made ineffective by the fact that the springs of the switch relays are alternately connected to the two poles of the input and the output of the amplifier and thus form a bridge connection whose arms contain only one half of the whole connecting capacity at a time, so that the capacity variations exercise a considerably lesser influence. Although the percentage of the deviation from the bridge equilibrium is equal to that resulting in the method described above, in which the whole connecting capacity is adjusted by additional condensers, the bridge itself can be adjusted when the number of the telephone stations is even, so that, on the average, no voltage can be fed back from the output to the input. When the number of the telephone stations is odd, a very small trimming condenser suffices for the remaining adjustment.

To make the low frequency power output of each subscriber independent of the number of the connected subscribers, when the modulation percentage of the amplifier is practically constant, the coupling of the final stage is chosen so that the optimum external resistance is reached when all subscribers are connected at the same time. Furthermore, the amplifier works with voltage feedback. Further advantageous characteristics will become evident from the following description and the drawing, in which.

Figure 1:
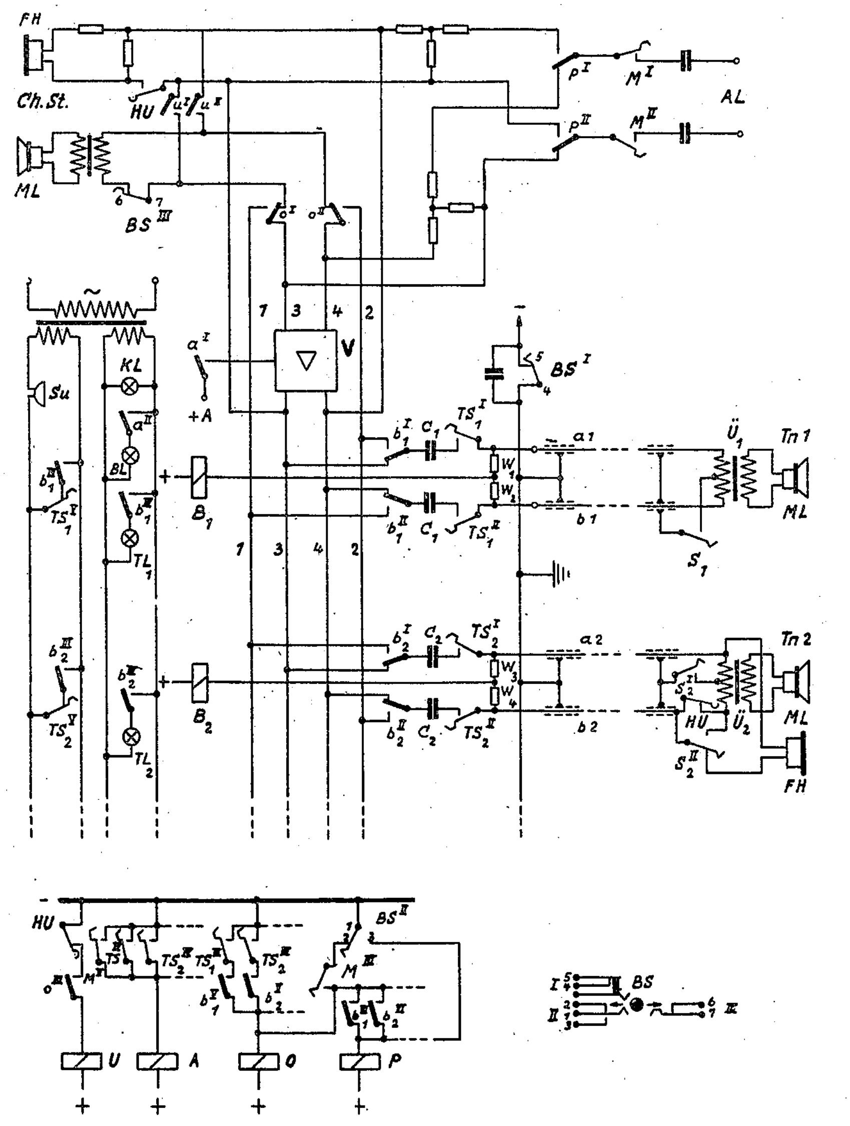
Fig. 1 is a conference call circuit arrangement according to one embodiment of my invention.

The circuit arrangement represented in Fig. 1 consists of a main station or chief station Ch. St. as well as of a number of telephone stations $Tn1$ to $Tnx$, of which only two are shown: a common amplifier V and of a connection to the telephone network AL. The telephone stations $Tn1$ to $Tnx$ are connected to the switchboard attached to the main station by shielded twin-wire cables. This switchboard is a manual switchboard in the form of a locking subscriber selecting key TS for each line. When key TS is actuated, the connection line concerned is connected with the amplifier by change-over contacts of a relay $B_{1 \ldots x}$ which is individually attached to each subscriber. It is preferred to provide non-locking keys $S_1$ etc. at the subscriber stations which, when actuated in the normal state of the installation, merely produce a calling signal in the main station, whereas their actuation when the installation is in operation, effects a change-over of the telephone station concerned from the output of the amplifier to its input. The change-over itself is performed by means of two relays O and U, which operate after each other and thus ensure an increased operating safety for the changing-over. A further advantage of this arrangement results from the mode of operation utilizing reception by means of a telephone receiver, as is described later. An auxiliary relay A serves to connect the anode voltage to the amplifier when the installation is taken into operation. The current supply of the installation may be provided by a battery, from the direct current mains or from the alternating current mains by way of a rectifier arrangement. For the example which is chosen here the latter case is assumed. To avoid loud clicks when it is switched on, it is desirable to arrange the anode voltage switch between the charging and the smoothing condenser in the filter of the mains supply; an ohmic resistance serves to smooth the current instead of a choke. With this, additional switch devices become superfluous. When the current is supplied from the mains in this way, it is possible to feed the signalling installations with alternating current by way of the mains transformer.

The signalling installations themselves are extremely simple and give a visual indication of the operating state of the installation at any time. They consist of a common warning lamp BL, of a line lamp $TL_{1 \ldots x}$ attached to each subscriber's station and of a common audible calling signal, for instance, of a buzzer *Su*. Besides, when the current is supplied from the mains a pilot lamp KL is provided. Since all exchange operations are concentrated in the main station, a special signalling in the extension stations is not required. The subscriber lamps flash up only when the extension station concerned takes the answering position, while the warning lamp remains switched on all the time the installation is in operation. If the chief, for instance, after a conference is finished has omitted to put all subscriber selecting switches back to the normal position, all subscribers are enabled to overhear him as the switches are not in the normal position. The warning lamp, which is red, calls his attention to the danger of being overheard. The known conference call installations and loud speaker installations lack the characterization of the answering direction by means of the subscriber lamps, since there these lamps are needed to characterize the connection. In one of the known arrangements, a characterization of the desired answering line is provided, by the fact that the subscriber lamp in the main station, which is switched on once the connection is established, extinguishes when the speaking key in the corresponding extension station is actuated. In the case of a conference call operation, however, such a negative characterization cannot be used, since, when there are several telephone stations which are connected and other stations which are not connected, whose lamps are not lit; of course, it can easily be sent when the lamp of a station which is taking part in the conference extinguishes.

As a further switching means there is an operating switch BS in the main station with one steady position and two operating positions, one of which is made self-restoring, the other locking. When this switch is turned down to its non-locking position, it serves to disconnect a speaking extension station, while all extension stations potentially in answering position are connected to the amplifier output again and thus are enabled to hear the main station. After this switch is released the previous operating state is immediately restored again. Moreover, it serves in the same position to reverse the speaking direction of the main station in the case of a connection with a lead wire of the outgoing network. In its locking position the main station is disconnected from the conference network, an existing conference not being disturbed. The course of this conference may be recognized at any time from the signal lamps; in the same way it is always possible to re-enter into a conference. To make it possible, as already mentioned, to establish a connection to an exchange line of the public telephone network, still another switch M is provided.

A telephone receiver FH can be attached to any station to insure privacy in reception. To enable the chief station to speak freely even when the telephone receiver is used instead of the loudspeaker, the arrangement of the successively operating relays O and U is provided for reversing directions. The relays U which connect the chief station to the amplifier output, becomes de-energized when the receiver FH is unhooked. Therefore, the loudspeaker of the chief stations is connected as a microphone to the amplifier input when sending, but remains disconnected when receiving. In extension stations which are equipped with telephone receivers the mode of operation is the same. This is accomplished by means of a hook switch contact and an additional contact for the speaking switch.

As for the details, the mode of operation of the installation is contained under the following headings:

I. *Connection of the main station to an extension station*

When the subscriber at the main station wants to establish a connection to an extension station, for instance to $Tn1$, he closes the selecting switch $TS_1$ corresponding to this station. By the contacts $TS_1I$ and $TS_1II$ of this switch the speaking wires $a_1b_1$ of the extension station line are connected to the output of the amplifier. When $TS_1IV$ is closed, the anode voltage relay A is energized, which connects the amplifier to the anode voltage by its contact $aI$ and switches on the visual engaged lamp BL by $aII$. By opening $TS_1V$, the circuit for the acoustic calling signal is opened for the extension station $Tn1$ and, eventually, by $TS_1III$ the answering circuit of this station is prepared. The circuit is thus readied for speaking. The speaking circuit may be traced over the following course:

ML-equipment of chief station, BSIII, OI/OII, amplifier V (input-output), $b_1I/b_1II$, blocking condensers $C_1$, $TS_1I/TS_1II$, $a_1/b_1$, transformer $U_1$, ML-equipment of $Tn1$.

The subscriber at the main station is enabled to speak at once and the subscriber at the extension station hears the spoken words in the loudspeaker.

II. *Subscriber at the extension station answers*

If the called subscriber at the extension station wants to answer, he actuates his speaking key $S_1$. By this operation the following signalling circuit is completed: — in the main station, BSI, shield of the wires $a_1b_1$, $S_1$, centre tap of the transformer $U_1$, $a_1$ $b_1$, $W_1$ $W_2$, $B_1$, +.

In this circuit, $B_1$ pulls up and changes the extension station line at the contacts $b_1I$ and $b_1II$ from the output terminals of the amplifier over to the lines 1/2. Over $b_1V$ the energizing circuit is closed for relay O:

—, $TS_1II$, $b_1V$, O, +.

Relay O pulls up and connects in relay U:

—, HU, OIII, U, +

Upon operation of the O relay, the contacts $oI$ and $oII$ make and the microphone-loudspeaker telephone set of the main station ML is disconnected from the amplifier input, and the latter is connected to the lines 1/2 and in this way to the telephone station $Tn1$. Simultaneously, the loudspeaker ML of the main station is connected to the amplifier output by contacts $uI$ and $uII$ which make as a result of the operation of relay U. Consequently, the speaking direction between the main station and the extension station $-Tn1$ is reversed. This operating state is indicated optically to the main station, the subscriber lamp $TL_1$ flashing up by way of contact $b_1IV$. The buzzer calling signal device SU is not connected in this case when contact $b_1III$ is closed, since contact $TS_1V$ of the subscriber selecting switch is open. The extension station may now communicate. The subscriber at the main station need not actuate any further switches.

III. *Connection of extension station to main station*

If an operator at an extension station, for instance $Tn1$, wants to set up a connection to the main station, he actuates its speaking key $S_1$. By this operation, the same energizing circuit for relay $B_1$ is completed as is described above in connection with the operation under heading II. Since, however, the selecting switch $TS_1$ is in its normal position, the other relays do not pull up for the first time, but merely the subscriber lamp $TL_1$ is switched in as well as the buzzer $Su$ by $b_1III$ and $TS_1V$. Thus the operator at the main station is informed that there is an incoming call from the extension station $Tn1$, and actuates the switch $TS_1$. Thereupon, the relays A and, provided that key $S_1$ in the extension station is still pressed, O and U are energized and the buzzer calling signal SU is switched off. The main station is now ready to listen. The reversal of the speaking direction through the amplifier is performed automatically when the key $S_1$ is released again in the extension station; this makes $B_1$, O and U restore. But the possibility is also present that the main station will interrupt the extension station. For this purpose, the operating switch BS must be turned down to its non-locking position; this disconnects the negative pole from the signal circuit so that $B_1$, and with this relays O and U, too, release. Then the subscriber at the extension station will hear the main station no matter in which position its speaking key is.

IV. *Conference call operation*

A conference may be called exclusively by the main station by turning down the subscriber selecting switches of all subscribers who are to take part in the conference call. This can be performed, of course, also at the request of an extension station, after this station has informed the main station about its wishes referring to this call in the above described manner. When several switches TS are simultaneously operated, the extension stations to which a connection can be set up by these, are connected in parallel to the output of the amplifier and thus are enabled to hear the main station all at the same time. The answer back to the main station is performed in the same way as in the case of a single connection by operation of the key S in the answering extension station. In this operation, only the extension station concerned is connected to the input of the amplifier and the main station to its output as can be clearly seen from the circuit arrangement. The main station is thus connected to the amplifier output in parallel with the other extension stations, and the answer is heard by all stations taking part in the conference. It is necessary, of course, to maintain a certain operating procedure. In case several subscribers attempt to answer at the same time, the ordinary speaking sequence can be restored by the intervention of the main station; the main station interrupts all answering subscribers by turning down the switch BS to its non-locking position and asks them to keep to a certain answering sequence which can be prescribed. It is heard by all connected extension stations. The main station may also disconnect itself from an existing conference call without hindering the other connected extension stations in their communication. This is achieved by turning down the operating switch BS to the locking position. Thereby, contact III of BS is opened, thus disconnecting the speaking circuit of the main station between the loudspeaker ML and the contacts which reverse the direction. By turning back the switch BS the main station can re-enter into the existing conference at any time. From this it follows that the main station is also able to work only as an exchange station. The conference communication between the other extension stations without main station is performed as follows: All extension stations connected to the circuit by the switches TS are arranged to receive, only that station which is speaking, and for this purpose the speaking station actuates its speaking key, being connected to the input of the amplifier. When the extension station $Tn1$ is answering, for instance, the speaking circuit may be traced over the course from the ML-set of this station via $U_1$, $a_1/b_1$, TS I/II, $G_1$, $b_1$I/II, $o$I/II, amplifier input-amplifier output, line 3/4 to the subscribers further connected by their respectively operated switches TS. The main station is always able to recognize the state of this conference from the subscriber lamps TL, which illuminate each time. If there is a conference already in operation and other subscribers are calling who are not yet connected, their call is signaled in the usual way; in this case these stations are not able to effect a reversal of the direction. This is not possible until the main station accepts the call by turning down the corresponding TS-switch. In the same way any subscriber may be disconnected from the present existing conference by turning back his selection switch TS at any time.

If no acoustic call of other stations is desired during a conference, it is possible to prevent this by means of an additional resting contact of relay A in the circuit of the buzzer. Then the calling signal is given merely by the subscriber lamp.

V. *Private communication*

For private communication, the extension stations, with which such a communication may be had, are each equipped with an additional telephone receiver FH. In this case corresponding buffer resistances are connected in the receiver circuit.

The receiver circuit of the main station is permanently connected to the amplifier output and contains an opened hook switch HU contact in one of the speaking wires. A resting contact on the hook switch interrupts the connection to relay U when the receiver is unhooked. With this, the loudspeaker of the main station is always disconnected from the output. If no extension station operator has pressed his switch S, ML is connected as a microphone to the input. If an extension station is answering, the ML-set is connected neither to the input nor to the output. The telephone receiver FH of the extension station is connected in parallel to the speaking wires ahead of the interruption point of the HU-contact by way of the resting side of an additional change-over contact of the speaking switch S. If speaking will be required, the loudspeaker is connected in as a microphone again by operation of the speaking switch; this occurs because the change-over contact (for instance $S_2$II) of the speaking switch bridges the HU-contact, the receiver being disconnected.

VI. *Connection to a line of the outgoing telephone network*

The additional circuit arrangement for a connection to the outgoing telephone network makes it possible for subscribers of the telephone network to be included in conference calls. Incoming outside telephone calls are accepted by a regular telephone sub-station apparatus at the main station, which is not shown here. If this call is to be connected to the conference call installation, the receiver of the telephone apparatus must not be hung up. In the main station the switch M is turned down. By doing this, the incoming exchange line AL is connected to the amplifier input. At the same time via

—, BSII, MIII, O, + relay O and subsequently relay U is energized. Consequently the subscriber at the main station normally connected to the amplifier input, is changed over to the amplifier output. Now he hears the exchange call in his loudspeaker. Any subscriber of the conference call installation can take part in this call provided that the corresponding switch TS is turned down; then any subscriber can hear the exchange call. Whosoever wants to give an answer, including the main station, may do this by actuating his speaking switch and thereby reversing the speaking direction. At the same time the exchange line is switched over to the amplifier output. This is performed by means of a relay P, which is connected in by way of BSII when the main station answers, and by way of contacts of the then energized B-relay when an extension station answers, as for instance by a path via —, BSII, MIII, $b_2$VI, P, +

Figure 2:
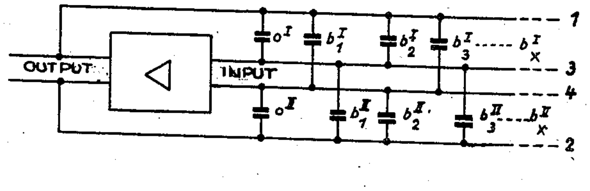
Figs. 2 and 3 illustrate circuit arrangements for reducing amplifier feedback through the capacities between the contacts of the change-over relays.
Figure 3:
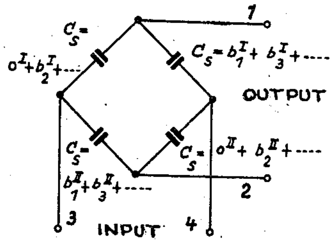

Consequently a perfect conference communication is established to the exchange subscriber; each speaking station being heard by all other connected stations and each also able to speak to all other stations. Also in the case of an outside telephone conference the main station has the speaking priority and can interrupt the extension stations by turning down BS to its non-locking position. It will be realized that the outside telephone subscriber cannot interrupt. The output and input of the amplifier are adjusted to the outside telephone level by means of separate voltage divider networks. By this measure sidetone feedback is prevented from being picked up by the loudspeaker which is acting as the microphone. By contact MV of the outside telephone switch, the anode relay A is made to pull up via an obvious circuit so that it is possible to establish outside telephone connections to the main station only. Figs. 2 and 3 illustrate the connection capacities of the change-over contacts of the relays O and B, which may cause oscillation in the amplifier. Since only one of the two relays O and U can contribute to this capacity feedback at a time, here only the connection capacity of the contacts $o$I and $o$II is taken into account, correspondingly. Fig. 2 shows the mode of connection of the contacts in the speaking direction, these contacts being represented as equivalent capacitances. Fig. 3 shows the same arrangement in a bridge representation. From these figures it becomes evident that a practically complete adjustment is only possible when the number of the subscribers is odd. The asymmetry occurring in the case of an even number of subscribers is small, however, as it only amounts to the value of the connection capacity of one contact pair. Besides, this asymmetry can be adjusted by means of a small additional condenser.

Figure 4:
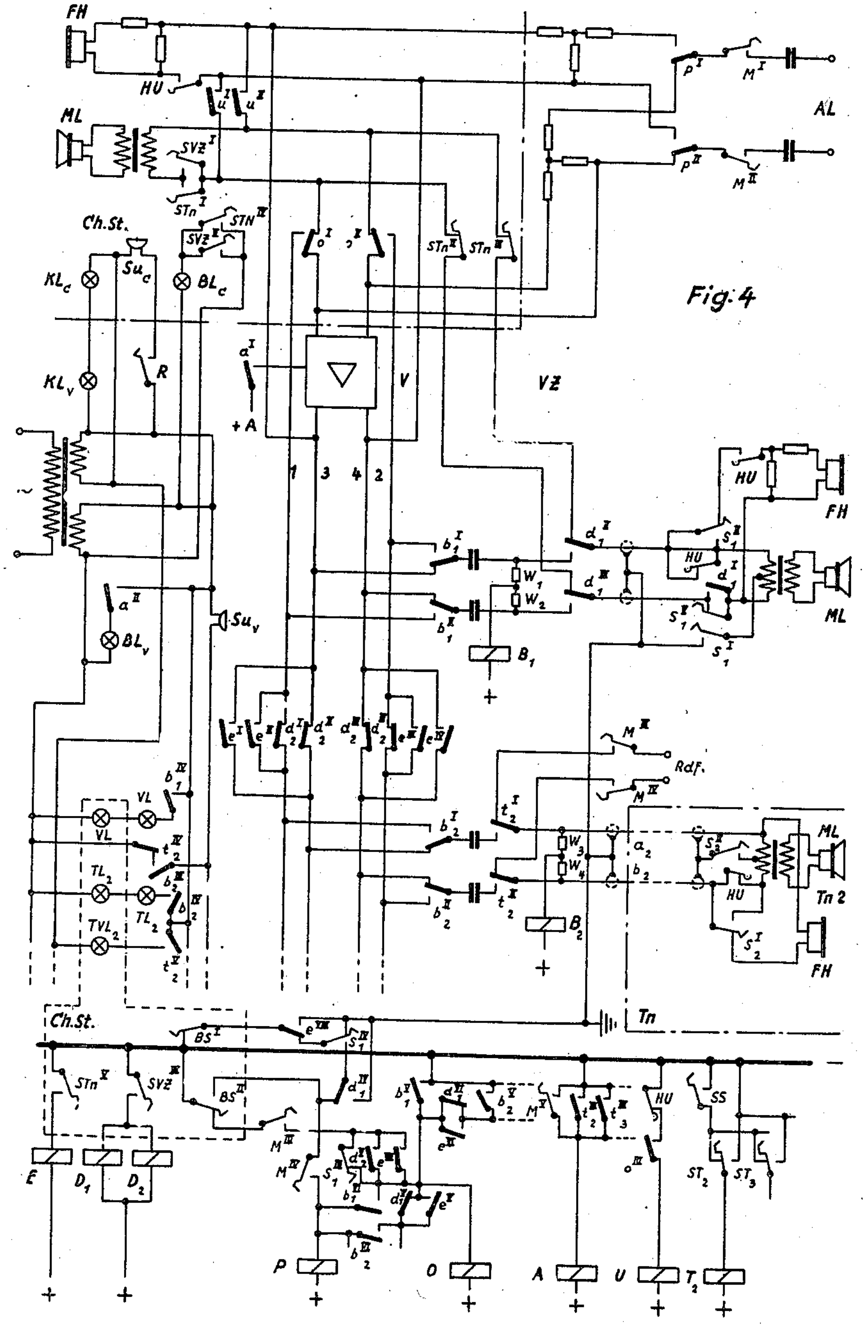
Fig. 4 is another embodiment of my invention in which a conference arrangement is established by an auxiliary station instead of the main station.

In practice it will frequently occur that one will not expect the main station to take the trouble of selecting the subscribers, respectively, for the calling of the conference. In this case it is feasible to attach a so-called anteroom or secretary station to the main station, which takes over the exchange service. Such a measure can be taken also in conference call installations according to the invention. The circuit arrangement shown in Fig. 4 represents such an installation in which the anteroom station can completely perform the duties of the main station without a change of the mode of operation of the conference call installation becoming necessary and without impairing the activity of the real main station, which remains privileged to retain control of all possibilities of connection as before.

The main station possesses the same basic equipment as in the installation described above, that is, speaking keys, pilot lamps and warning lamps. The selection of the subscribers, however, is taken from it and given to the anteroom connection. To this basic equipment a switch SVZ is added for the communication between the main station and anteroom, which is made locking in its working position. There is also added a switch ST*n* locking in the same way, which serves to establish the connections to the subscribers of the conference without an operation of the anteroom. The additional installation for the communication with outside telephone subscribers is the same as before with the exception that here, too, the devices for the corresponding change-over of the telephone station are attached to the anteroom.

Since the main station does not possess any single station selecting switches, it must get additional signalling installations, which clearly characterize the operating state of the installation at any time. This is performed by a lamp board with two lamps for each existing subscriber station, the one of which, $TL_2$ etc., serves as a line lamp as before and characterizes the answering subscriber in any case, while the other, $TVL_2$ etc., indicates the switched in connections and flashes up as long as the connection lasts no matter in which direction the communication takes place. Because of the numerous connections required to be made by the single switches, auxiliary relays are connected to and are controlled by the switches and take over part of their connecting duties. The mode of operation of this installation will be briefly described with reference to the analogous mode of operation of the installation described in connection with Fig. 1. In Fig. 4 identical circuit elements which correspond to those of the connections according to Fig. 1 are given the same reference characters so far as possible. For simplicity beside the main station and anteroom station, only one extension station is shown.

I. *Establishing the connection from the anteroom*

If none of the switches is actuated, the anteroom station works as a main station, accepts calls, calls conferences etc. in the same way as this is described above for the main switch. In this case the anteroom station is connected to the amplifier input by the contacts $d_1$II and $d_1$III as well as the switch contacts ST*n* II and ST*n* III of the main station, and is able to speak freely when the receiver is hung up. By actuating the corresponding subscriber selecting switches $ST_2$, $ST_3$ etc. the anteroom controls conferences; in this the signalling is performed in the same way as before, that is, call by buzzing tone and line lamp TL, which also flashes up when a subscriber answers. The anteroom has a change-over privilege; consequently it can interrupt an existing conference at any time and speak. This is effected by the contact $S_1$IV of its speaking switch, which disconnects the minus potential from all signaling circuits.

The anteroom is also able to establish connections to subscribers of the outside telephone network without troubling the main station, it to accept calls, to exchange them to extension stations and to set up conference call connections of any number of subscribers to the telephone subscriber. In doing so it can connect or disconnect itself as it pleases. The reception of exchange calls is performed by a usual telephone apparatus connected to the exchange, the changing-over of these calls to the conference call installation being effected by actuating the switch M. By this, relay O and with it also relay U are energized by way of BSII, MIII and $S_1$III, and connect the anteroom apparatus to the amplifier output. By actuating the switches ST any number of extension stations can be connected in parallel to this to the amplifier output. Each station, including the anteroom, can reverse the speaking direction by actuating its speaking switch S; in this case in the extension stations, the reversal is effected by energizing the B-relays, whose contacts (for instance $b_2$I and $b_2$II) effect the change-over of the station concerned to the amplifier input, while by way of $b_2$VI and $d_1$V, parallel to O, relay P is energized, which switches the exchange line over to the amplifier output. If the anteroom wants to answer then, by actuating the speaking switch the O-relay is de-energized, because $S_1$III is disconnected, and this causes the anteroom apparatus to change back to the amplifier output, while relay P is energized by way of BSI, *e*VIII, $S_1$IV, $d_1$IV, MIV for the purpose of changing over the outside telephone connection. This is necessary, because the $B_1$-relay of the anteroom circuit arrangement is disconnected from the signalling circuit at the $d_1$-contacts. By $S_1$IV the minus wire to the extension stations is disconnected at the same time so that the anteroom obtains the changing-over privilege. In the case of connections with outside telephone subscribers, the amplifier is put in action by switch contact MV, which connects the anode voltage relay. The station switch $S_1$ of the anteroom apparatus has a second working position, corresponding to switch BS in Fig. 1. When it is turned down to this position the anteroom disconnects itself from the conference circuit.

The present operating state of the installation is indicated on the lamp board of the main station at any time. It can be readily ascertained from the flashing lamps TL, which stations are taking part in the communication; since TL indicates which station is speaking.

II. *Communication of chief station with anteroom*

If the subscriber at the main station wants to set up a communication to the anteroom, he turns down his switch SVZ. Thereby, his speaking line is connected through to the amplifier input by SVZI, and by SVZIII the relays $D_1$, $D_2$ are connected and which, by their contacts $d_1$II and III disconnect the anteroom apparatus from the amplifier input and change it over to the output. By contacts $d_2$I to IV the other extension stations are disconnected. By SVZII the warning lamp $BL_c$ is switched in. These actions take place no matter whether the installation was resting at this moment or some connection between anteroom apparatus and/or other extension stations was already established. In the latter case merely the lamp signalling persists, since the minus wire remains connected to the shields of the single subscriber lines by BSI, *e*VIII, $S_1$IV, ($d_1$VI). If the anteroom had disconnected itself from an established connection by turning down $S_1$V, the main station could speak to the anteroom immediately in spite of this, this switch contact being bridged by $d_1$I. The anteroom now operates in the same way as an extension station; consequently it must press its speaking key to the speaking position when it answers. By this operation relay $B_1$ is energized, switches in the anteroom lamps VL to characterize the answer and reverses the speaking direction in the well-known way by means of energizing relay O by $b_1$V and U by *o*III. The main station is able to interrupt the anteroom subscriber at any time by actuating its switch BS. If a subscriber of the telephone network is included in the communication of main station to anteroom, by closing the contact $d_2$V the speaking switch contact $S_1$III of the anteroom is short-circuited so that the connecting operations of the relays O and P are not changed though the main station is taking part in the communication. The main station is connected to the amplifier output, parallel to the anteroom, and has to actuate its switch BS when it is answering as it is described in connection with Fig. 1.

The operator of the main station is able to inform the anteroom operator about his wishes and after that to disconnect itself again or to wait until the desired connections are established. In the latter case he will actuate switch ST*n* at the same time in advance. Now the conference circuit is established in the usual way by the anteroom, the establishing state being indicated optically to the main operator. Besides, the anteroom can give the main operator a calling signal after the duties are performed by actuating R; by this operation the buzzer $Su_c$ being switched in.

III. *Communication of main station with extension station subscriber*

In the main station the switch ST*n* is actuated. By doing this relay E pulls up, and the anteroom is disconnected at the switch contacts ST*n*II, ST*n*III. The speaking switch $S_1$ of the anteroom cannot exercise any influence on relay O which serves to reverse the direction 7 or on relay $B_1$, since the *e*-contacts are turned down and bridge the corresponding switch contacts, and since the telephone station is entirely disconnected by the de-energized relay. The main station is able to communicate with the extension stations in the usual way; these are able to answer by actuating their speaking switches. By means of its switch BS the operator at the main station again has the changing-over privilege, even when a telephone subscriber is taking part. The main station, however, needs not exclude the anteroom apparatus from the conference circuit. If both switches ST*n* and SVZ are actuated, the anteroom is connected to the amplifier output by $d_1$II and $d_1$III like a normal telephone station. The change-over privilege rests with the main station, while it is taken from the anteroom in this case by bridging the switch contact $S_1$III. Disconnection of the extension stations is prevented by the contacts $d_2$I to IV, because these contacts are bridged by the contacts *e*I to IV.

IV. *Incoming calls from the extension stations and the anteroom*

When an extension station is calling, the corresponding B-relay, for instance relay $B_2$, is energized, which switches in the subscriber lamps TL in the anteroom and in the main station. At the same time the buzzer $Su_v$ is connected in the anteroom. The main station does not receive an acoustic signal. When the corresponding subscriber switch, for instance $ST_2$, is actuated, the subscriber is connected through to the amplifier, and the call is received by the anteroom. At the same time in the main station the connection indicating lamp TVL is switched on. The calling signal is switched off by a *t*-contact. When a connection to the main station is desired, the anteroom can call this station with the calling key R. The main station either can establish a direct connection to the calling station, who can be recognized from the flashing lamp TVL, by actuating the switch ST*n*, or it can make a request with the anteroom first by turning down SVZ.

Since the changing-over privilege is automatically transferred from the anteroom to the main station when the main station enters into a communication, this station is able to occupy the installation for its own purposes at any time no matter in which operating state it is. The circuit arrangement according to the invention permits establishing any imaginable combination of connections. The main station is released to the greatest extent from the necessity of undertaking switching measures and thus can almost always speak. Without its consent the main station can neither be overheard nor spoken to. Because of its flexibility and in spite of its simple construction, the installation offers many different possibilities for practical use in industrial plants, in offices, in hospitals, in hotels, on ships and the like.

Since the outside telephone communication usually is maintained by normal telephone apparatus with a microphone transmitter and since, in most cases, this apparatus is in the neighborhood of the microphone-loudspeaker telephone set of the main or anteroom station, there is the danger of an acoustic feedback by way of the microphone of this apparatus when the conference call installation is connected in. One can eliminate this danger in a simple way by making the microphone of the outside telephone apparatus inoperative, for instance by disconnecting it, by means of an additional contact of the telephone switch M when this switch is switched on.

To make the service more simple for conference calls with all extension stations a collective calling switch SS can be provided; whereby all subscriber relays are energized at the same time by the resting side of their single selection switches TS, and thus make the extension stations ready for a call.

Finally, one can use the conference call installations for broadcast relaying. For this purpose, change-over contacts are used for the connecting contacts of the $t$-relays, which connect an extension station line in its normal position to the connecting terminals R$df$ of a broadcasting distributor installation, possibly by way of another switch. For this purpose an existing switch as, for instance, the outside telephone switch M can be used, which is modified to provide a second working position end. This broadcast relaying installation can be provided both for single stations or for all stations. It is automatically disconnected at the stations concerned in case the conference call installation is needed.

While I have described above the principles of my invention in connection with specific apparatus it is to be clearly understood, that this description is made only by way of example and not as a limitation to the scope of my invention as set forth in the objects and in the accompanying claims.

What I claim is:

1. A multiple station telephone system for conference operation and intercommunication, comprising a main station and a plurality of extension stations, circuits interconnecting all said stations, a voice receiving and transmitting means adapted to operate as a microphone and loudspeaker located at each station, an amplifier, means normally connecting the input of said amplifier to the receiving and transmitting means of said main station, means for calling the main station from each extension station, and control means at the main station for selectively connecting the receiving and transmitting means of the extension stations in parallel to the output of the amplifier and said control means also simultaneously conditioning each connected extension station to enable it to switch its receiving and transmitting means from the output to the input of the amplifier and to enable each said connected extension station to switch the main station receiving and transmitting means from the input to the output of the amplifier, and switching means at each extension station for switching the connections to the amplifier of the receiving and transmitting means thereat and at the main station only when said extension station has been conditioned by said control means.

2. A multiple station telephone system as defined in claim 1, wherein the means for calling the main station includes a two wire shielded line connected as a phantom circuit with the two wires forming one conductor and the shields of said wires forming the return conductor.

3. The system defined in claim 1, including means at the main station for connecting and disconnecting its receiving and transmitting means from said amplifier without altering any other connections.

4. The system defined in claim 1, wherein the means for switching the connections to the amplifier include a plurality of relays connected to the input and output of the amplifier so that the capacities between the relay contacts form a substantially balanced bridge with the input of the amplifier connected across one diagonal of the bridge and the output of the amplifier connected across the other diagonal of said bridge, whereby feedback from the output to the input of said amplifier is minimized.

5. A system as defined in claim 1, including an outgoing telephone line and switching means at the main station for connecting said telephone line to the input of the amplifier and connecting receiving and transmitting means of the main station to the output of said amplifier in parallel with receiving and transmitting means of said extension stations.

6. A system as defined in claim 5, including an outgoing telephone line and means responsive to the switching means at the main and extension stations for switching said telephone line to the output of said amplifier when the transmitting and receiving means at any of said stations is connected to the input of said amplifier.

7. A system as defined in claim 1, including a telephone receiver at said main station, an outgoing telephone line, switch means at the main station for connecting said telehpone receiver to said line and simultaneously disconnecting said main station receiving and transmitting means from said amplifier.

8. A system as defined in claim 1, including means at the main station for reconnecting its receiving and transmitting means to the input of said amplifier and reconnecting the receiving and transmitting means at any extension station to the output of said amplifier.

9. A multple station telephone system for conference operation and intercommunication, comprising a main station, an auxiliary station, and a plurality of extension stations, circuits interconnecting all said stations, a voice receiving and transmitting means adapted to operate as a microphone and loudspeaker located at each station, an amplifier, means at the auxiliary station for connecting the input of said amplifier to the receiving and transmitting means of said main station, said circuits including means normally connected for calling the auxiliary station from any extension station, control means at the auxiliary station for selectively connecting the receiving and transmitting means of the extension stations in parallel to the output of the amplifier and said control means simultaneously conditioning each connected extension station to enable it to switch its receiving and transmitting means from the output to the input of the amplifier and to enable each connected extension station to switch the main station receiving and transmitting means from the input to the output of the amplifier, and means at each extension station for switching the connections to the amplifier of receiving and transmitting means thereat and at the main station when said extension station has been conditioned by said control means.

10. A multiple station telephone system for conference operation and intercommunication, comprising an auxiliary station, a main station, and a plurality of extension stations, circuits interconnecting all said stations, a voice receiving and transmitting means adapted to operate as a microphone and loudspeaker located at each station, an amplifier, means at each extension station normally connected to said circuits for calling the auxiliary station, control means at the auxiliary station for selectively connecting any one or more of the extension station receiving and transmitting means to the output of the amplifier and said control means also simultaneously conditioning each selectively connected extension station to enable it to switch its receiving and transmitting means from the output to the input of the amplifier and to enable each extension station to switch to the output of said amplifier any receiving and transmitting means connected to the input of the amplifier, and means at each extension station for switching the connections to the amplifier of receiving and transmitting means thereat when said extension station has been conditioned by said control means.

11. The system defined in claim 10, including means at the main station for connecting its transmitting and receiving means to said auxiliary station or to all of said connected extension stations.

12. The system defined in claim 10, including means at the main station for indicating the connected extension stations, and means at the main station for switching the receiving and transmitting means of any extension station from the input to the output of said amplifier.

13. The system defined in claim 10, including means at the main station for initiating voice communication with said auxiliary station through said amplifier.

14. The system defined in claim 10, including means at the main station for selectively initiating voice communication with said auxiliary station or any of said extension stations through said amplifier.

15. A telephone system comprising a plurality of stations having a common amplifier, said amplifier having a pair of input terminals and a pair of output terminals, said stations including a plurality of relays, means connecting the contacts of said relays to said terminals so that the capacities between said contacts constitute a substantially balanced bridge with the input terminals being one pair of diagonal terminals of said bridge and the output terminals being the other pair of diagonal terminals of said bridge.

HEINZ ROBERT RENSCH.

References Cited in the file of this patent

UNITED STATES PATENTS

| Number | Name | Date |
|---|---|---|
| 2,036,023 | Curl | Mar. 31, 1936 |
| 2,054,933 | Frazier | Sept. 22, 1936 |
| 2,162,369 | Campbell | June 13, 1939 |
| 2,162,370 | Campbell | June 13, 1939 |
| 2,249,456 | Campbell | July 15, 1941 |
| 2,275,406 | Berkley | Mar. 10, 1942 |
| 2,427,850 | Gehman | Sept. 23, 1947 |
| 2,449,344 | Tschumi | Sept. 14, 1948 |
| 2,529,912 | Campbell | Nov. 14, 1950 |
| 2,567,484 | Ivens | Sept. 11, 1951 |